United States Patent
Khlopkov

(10) Patent No.: US 11,131,121 B2
(45) Date of Patent: Sep. 28, 2021

(54) HIGHLY SECURE OPTICAL KEY ACCESS CONTROL SYSTEM

(71) Applicant: Konstantin Khlopkov, Saint Petersburg (RU)

(72) Inventor: Konstantin Khlopkov, Saint Petersburg (RU)

(*) Notice: Subject to any disclaimer, the term of this patent is extended or adjusted under 35 U.S.C. 154(b) by 328 days.

(21) Appl. No.: 16/422,978

(22) Filed: May 25, 2019

(65) Prior Publication Data

US 2020/0370339 A1 Nov. 26, 2020

(51) Int. Cl.
| | |
|---|---|
| E05B 49/00 | (2006.01) |
| G06F 21/62 | (2013.01) |
| E05B 19/24 | (2006.01) |
| E05B 17/10 | (2006.01) |
| G06F 16/583 | (2019.01) |
| G05B 1/00 | (2006.01) |
| G07C 9/00 | (2020.01) |
| G06K 7/10 | (2006.01) |
| G06K 19/06 | (2006.01) |

(52) U.S. Cl.
CPC .......... *E05B 49/006* (2013.01); *E05B 17/10* (2013.01); *E05B 19/24* (2013.01); *G05B 1/00* (2013.01); *G06F 16/583* (2019.01); *G06F 21/62* (2013.01); *G06K 7/10* (2013.01); *G07C 9/00182* (2013.01); *G06K 2019/0629* (2013.01); *G07C 2009/00785* (2013.01)

(58) Field of Classification Search
CPC ........ E05B 49/006; E05B 17/10; E05B 19/24; G06F 16/583; G06F 21/62; G05B 1/00; G06K 7/10; G07C 9/00182

USPC ......................................................... 250/229
See application file for complete search history.

(56) References Cited

U.S. PATENT DOCUMENTS

| | | | | |
|---|---|---|---|---|
| 3,735,374 A | * | 5/1973 | Rembault | G03H 1/041 356/71 |
| 5,283,431 A | * | 2/1994 | Rhine | B60R 25/04 250/229 |
| 5,838,232 A | * | 11/1998 | Kim | E05B 49/006 340/542 |
| 6,745,941 B1 | * | 6/2004 | Vega | G07C 9/00896 235/382 |
| 8,196,823 B2 | * | 6/2012 | Grayson | G02B 5/0825 235/384 |
| 8,462,322 B2 | * | 6/2013 | Duffy, III | G07C 9/00182 356/71 |
| 9,274,508 B2 | | 3/2016 | Duffy | |

(Continued)

*Primary Examiner* — Kerri L McNally

(57) ABSTRACT

A highly secure optical key access control system utilizing unique optical refraction properties of non-duplicatable transparent objects to secure premises or computer databases is disclosed. The said access control system includes an optical key containing an optical element with unique refraction properties and an access module comprising a light source, an image catching array and an electronic processor. The optical element of the optical key is inserted into the access module between the light source and the image catching array at the initial and then several following prearranged positions and a resulting set of unique refraction images appearing on the surface of the image catching array is processed with the electronic processor for comparison against preauthorized sets of refraction images to grant or deny access to the protected premises or protected computer databases.

9 Claims, 3 Drawing Sheets

(56) References Cited

U.S. PATENT DOCUMENTS 10,013,829 B2* 7/2018 Taylor ................ E05B 73/00
2004/0182923 A1* 9/2004 Bench ............. G06K 19/06046
235/382

* cited by examiner

HIGHLY SECURE OPTICAL KEY ACCESS CONTROL SYSTEM

BACKGROUND OF THE INVENTION

1. Field of the Invention

The present invention relates to the field of highly secure access control systems, and more particularly, methods and apparatus utilizing unique optical refraction properties of non-duplicatable transparent objects to secure premises and computer databases.

2. Discussion of the State of the Art

Existing access control systems based on traditional hardware based keys all have certain properties that make it possible one way or another to copy or mimic the key and therefore permit unauthorized access to controlled premises or computer databases.

Existing access control systems based on computer software are vulnerable to hackers with sufficient knowledge of computer systems and social engineering.

Existing electro-optical and magnetic card access control systems are easy to operate and cost effective. They possess a certain level of security but have the same shortcomings: if a person with sufficient knowledge gets the key or card, it is possible to study distinctive properties of the particular key or card and then copy or mimic it in terms of the key-lock system.

So, most of the shortcomings of existing access systems are related to the ease of duplication or mimicking distinctive properties of keys or cards which provide access, therefore, the less information potential forger can get about lock-key system having a particular key or card at hand, the more secure a system is in general.

An example of an optical access system is U.S. Pat. No. 5,283,431A issued to Raymond J. Rhine published 1994 Feb. 1. An access security system there employs a non-duplicatable key made from an optically transmissive material having gradient refractive index and diffusive properties which provide the material with a non-duplicatable quality. While being functional for its intended purpose, this system appears vulnerable to mimicking the key in terms of the key-lock system.

An example of a prismatic lock and key security is U.S. Pat. No. 9,274,508B2 issued for William R. Duffy, III, Phillip D. JonesMichael, K. TrivetteDavid, T. Windell published 2016 Mar. 1. In this patent described methods and apparatus for lock and key security, a lock including a light receptacle, a scatter pattern detecting module, and a locking mechanism, a key including a light source and a prism, the lock and key security including receiving, in the light receptacle of the lock, light transmitted by the light source in the key through the prism; identifying, by the scatter pattern detecting module, a scatter pattern of the received light; comparing, by the scatter pattern detecting module, the scatter pattern to a unique preauthorized pattern for operating the lock; if the scatter pattern matches the unique preauthorized pattern, switching, by the scatter pattern detecting module, the current locking state of the locking mechanism; and if the scatter pattern does not match the unique preauthorized pattern, maintaining the current locking state of the locking mechanism.

The shortcoming of this system is the key: this system comprises a key in which the optical prism and the light source are both placed inside of the optical key in a fixed position. In spite of the extreme difficulties of copying optical properties of a prism, a potential forger having a particular optical key at hand and sufficient knowledge can one way or another mimic or copy not the prism but the authorized scatter pattern to deceive scatter pattern detecting module of the lock and so to get unauthorized access to protected premises.

SUMMARY OF THE INVENTION

In an embodiment of present invention a highly secure optical key access control system is provided, including such apparatus as an optical key with an optical element with unique refraction properties and an access module including a light source, an image catching array, means of positioning the optical key inside of the access module and an electronic processor.

The said access control system utilizing unique optical refraction properties of non-duplicatable transparent objects to secure premises or computer databases comprises an optical key containing an optical element with unique refraction properties and an access module comprising a light source, an image catching array and an electronic processor. The optical element of the optical key is inserted into the access module between the light source and the image catching array in several prearranged positions and a resulting set of unique refraction images appears on the surface of the image catching array and the said resulting set of images is caught with the image catching array and processed with the electronic processor for comparison against preauthorized sets of refraction images to grant or deny access to protected premises or protected computer databases.

Also, in further embodiment of the invention the access module is provided, comprising means of adjustment the initial fixed position of the light source and the image catching array relatively to the initial position of the optical element of the optical key inserted into the access module and such way making each access module unique in terms of the lock-key system.

An advantage of the present invention in a sense of security level is that the light beam from the light source is directed through the optical element from several different directions, so not one unique refraction image but set of unique refraction images should match the preauthorized ones.

Another advantage of the present invention in a sense of security level is that the light source is located inside of the access module and its initial position and the direction of the light beam relatively to the optical element of the optical key inserted into the access module are unique and cannot be calculated by potential forger, therefore, having an optical key at hand is not enough for a potential forger to correctly figure out desired sets of preauthorized refraction images.

BRIEF DESCRIPTION OF SEVERAL VIEWS OF DRAWINGS

DETAILED DESCRIPTION OF THE INVENTION

The inventor provides a highly secure access control system, and more particularly, methods and apparatus utilizing unique optical properties of non-duplicatable transparent objects to secure premises and computer databases. An Optical key and an access module as the terms used in this specification refer to the apparatus by which user can get access to secure premises or computer databases using the optical key as a key and the access module as a lock.

The present invention is described in enabled detail in the following examples, which may represent more than one embodiment of the present invention.

Figure 1:
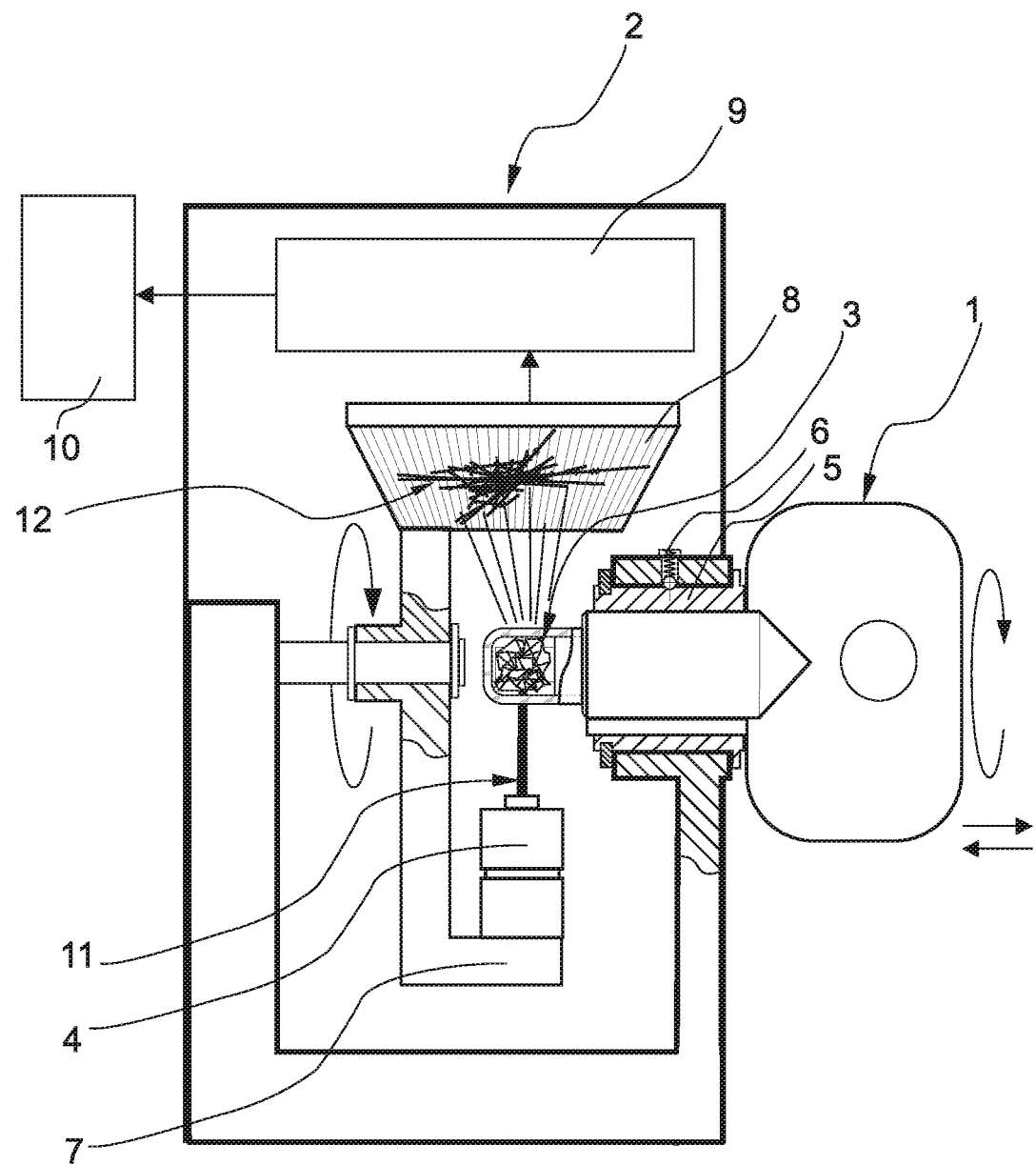
FIG. 1 depicts a schematic diagram illustrating the method of highly secure optical key access control system according to an embodiment of the present invention.

FIG. 1 is a schematic diagram illustrating the method of the highly secure optical key access control system according to an embodiment of the present invention.

In this example an access control system comprises: an optical key 1 with an optical element 3 and an access module 2 comprising a light source 4, means 5 and 6 of positioning the optical key inside the access module, an image catching array 8, means 7 for initial adjustment of the fixed position of the light source and the image catching array relatively to the initial position of the optical element of the optical key inserted into the access module, an electronic processor 9 and an access actuator 10, according to an embodiment of the present invention.

To start the process of recognition of the optical key, user of the access control system inserts the optical key into the access module 2 at the initial position and then turns or moves the optical key to put the optical element 3 of the optical key 1 in several following prearranged positions relatively to the light beam 11 of the light source 4 and the image catching array 8 to produce a set of unique refraction images 12 on the surface of the image catching array. Because of highly different refraction patterns of the light beam 11 emitted by the light source 4 passing through a medium and the optical element 3 of the optical key 1 depending on relative positions of the optical element, the light source and the image catching array, the set of refraction images 11 displayed on the surface of the image catching array 8 possesses unique light and shape properties and thereby can be used for recognizing a particular optical key in terms of the key-lock system. To do so, the set of unique refraction images is processed with the electronic processor 10 for comparison against preauthorized sets of refraction images to grant or deny access to protected premises or protected computer databases. If the set of unique refraction images matches one of the preauthorized sets, the electronic processor grants access to secured premises and computer databases with the access actuator 10.

To further improve the level of security, the access module has means of adjustment of the initial fixed position of the light source and the image catching array inside of the access module. In the exemplary access module it is realized as a swing frame 7 with the light source 4 and the image catching array 8 mounted on it. That makes it possible to change the direction of the light beam relatively to the inserted into the access module optical element 3 of the optical key 1 for a particular access module on the initial position, therefore, each access module can be considered unique in terms of the key-lock system. So, for potential forger, having an optical key at hand is not enough to correctly figure out the desired sets of preauthorized refraction images because the initial position of the optical element of the optical key relatively to the position and direction of the light beam inside the access module are unknown for them.

Readers of skill in the art will immediately recognize that different means of changing the initial fixed position of the light source, the direction of the light beam, and the position of the image catching array relatively to the optical element of the inserted optical key may be configured in accordance with embodiments of the present invention.

Figure 2:
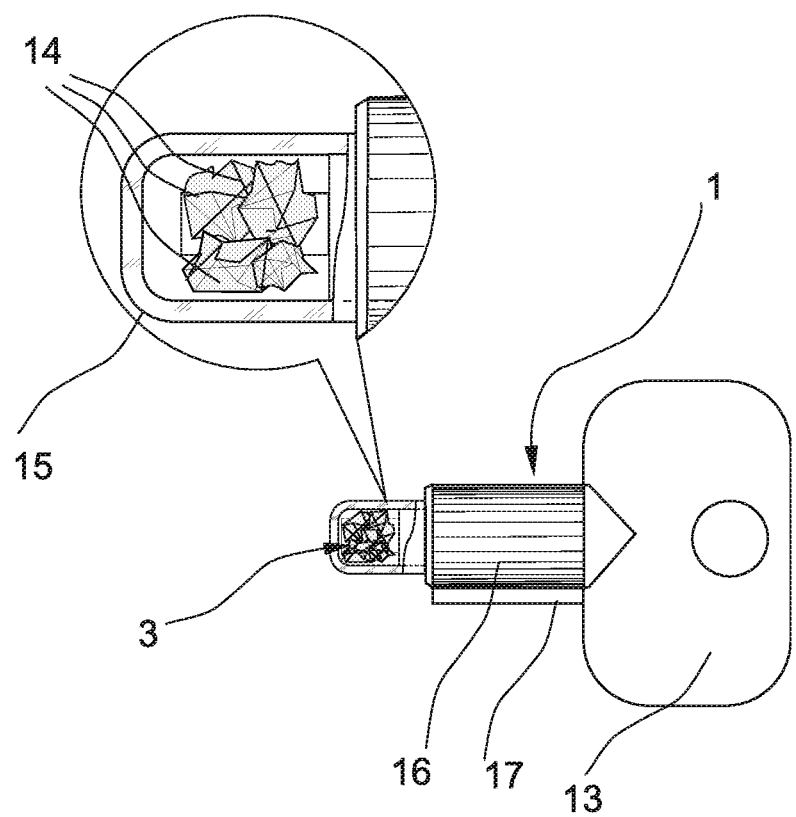
FIG. 2 depicts an example of an optical key containing an optical element with unique refractive properties, according to an embodiment of the present invention.

FIG. 2 depicts an example of an optical key 1 comprising an optical element 3 with unique refractive properties and a body 13, where the optical element 3 consists of one or several transparent objects 14 of random highly irregular shape fixed in a random position in relation to each other and to the body of the optical key and the refraction index of said one or several transparent objects is different from the refraction index of the medium. The body of the optical key 13 includes a protective transparent cover 15 of the optical element 3 and means of positioning the optical key inside of the access module such as a rod 16 and a spline 17.

Readers of skill in the art will immediately recognize that not one but many different means may be configured to put the optical element of the optical key into the access module at the initial fixed position and then to the several following prearranged position in accordance with embodiments of the present invention.

Figure 3:
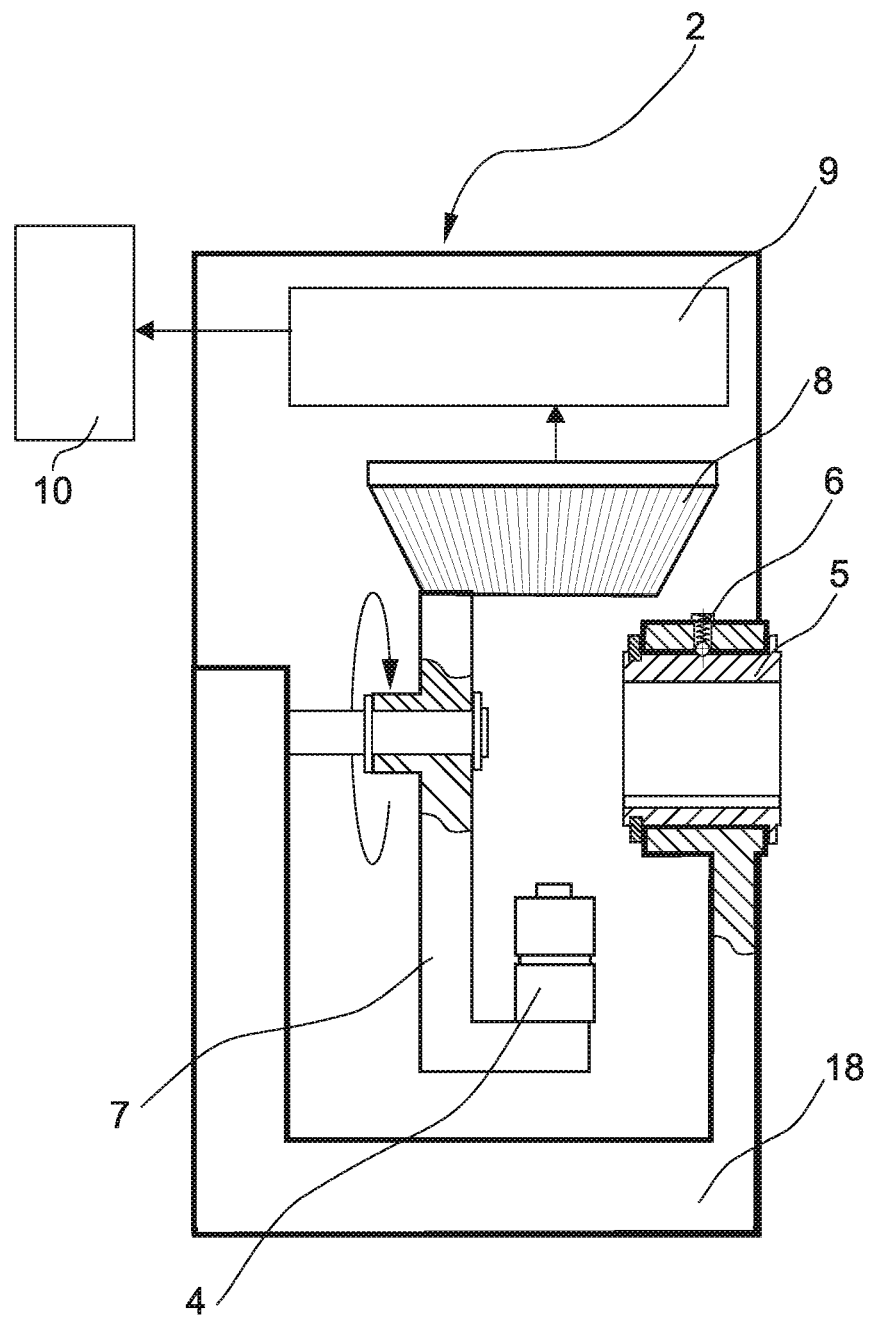
FIG. 3 depicts an example of an access module according to an embodiment of the present invention.

FIG. 3 depicts an example of an access module according to the embodiment of the present invention. The access module 2 in this example consists of a casing 18 including a light source 4, means 5 and 6 for positioning the inserted optical key at the initial and several following prearranged positions inside the access module, an image catching array 8, a swing frame 7 with the light source 4 and the image catching array 8 mounted on it as means for changing the initial fixed position of the light source and the angle of the light beam relatively to the inserted into the access module optical element 3 of the optical key 1, an electronic processor 9, and an access actuator 10.

It will be apparent to one with skill in the art that the highly secure optical key access control system of the invention may be provided using some or all of the mentioned features and components without departing from the spirit and scope of the present invention. It will also be apparent to the skilled artisan that the embodiments described above are specific examples of a single broader invention which may have greater scope than any of the singular descriptions taught. There may be many alterations made in the descriptions without departing from the spirit and scope of the present invention.

The invention claimed is:

1. A method of highly secure optical key access control system, comprising an optical key and an access module, the optical key comprising an optical element with unique refraction properties, the access module comprising a light source configured to produce a light beam, an image catching array, means of positioning the optical key inside of the access module and an electronic processor, the method comprising:
    positioning the optical element with unique refraction properties with the means of positioning the optical key inside of the access module between the light source and the image catching array of the access module in several prearranged positions;
    directing the light beam from the light source through a medium and the optical element with unique refraction properties from several different directions to project a refracted light beam onto the image catching array to produce a set of refraction images;

catching the set of refraction images with the image catching array;

processing the set of refraction images with the electronic processor for comparison against preauthorized sets of refraction images to grant or deny access to protected premises or protected computer databases.

2. The method of highly secure optical key access control system of claim 1 further comprising a laser light source as the light source.

3. The method of highly secure optical key access control system of claim 1 further comprising a visible-spectrum light source as the light source.

4. The method of highly secure optical key access control system of claim 1 further comprising a infrared light source as the light source.

5. An apparatus of highly secure optical key access control system comprising an optical key and an access module, the optical key comprising an optical element with unique refraction properties, the access module comprising:

light source configured to produce and direct a light beam through a medium and the optical element with unique refraction properties of the optical key;

an image catching array configured to catch a sets of refraction images produced with a refracted light beam after the light beam was directed through the medium and the optical element with unique refraction properties of the optical key from several different directions;

means of positioning the optical key inside of the access module configured to position the optical element with unique refraction properties between the light source and image catching array at several different positions for directing the light beam from the light source through the medium and optical element with unique refraction properties from several different directions;

means of adjustment of the access module configured to fix a position of the light source and the image catching array relatively to a position of the optical element with unique refraction properties of the optical key inserted into the access module;

an electronic processor configured to compare the set of refraction images produced with the refracted light beam directed through the medium and the optical element with unique refraction properties against the preauthorized sets of refraction images to grant or deny access to protected premises or protected computer databases.

6. The apparatus of a highly secure optical key control system of claim 5, wherein the optical key contains the optical element with unique refraction properties which consist of one or several transparent objects of random highly irregular shape fixed at a random position n relation to each other and to the body of the optical key and refraction index of said one or several transparent objects is different from refraction index of the medium.

7. The apparatus of a highly secure optical key control system of claim 5, wherein the access module further comprises a laser light source as the light source.

8. The apparatus of a highly secure optical key control system of claim 5, wherein the access module further comprises a visible-spectrum light source as the light source.

9. The apparatus of a highly secure optical key control system of claim 5, wherein the access module further comprises an infrared light source as the light source.

* * * * *